United States Patent
Belser et al.

(10) Patent No.: US 6,373,792 B1
(45) Date of Patent: Apr. 16, 2002

(54) REDUCTION OF A TEMPERATURE IN A LUBRICANT INTERFACE

(75) Inventors: Karl A. Belser, San Jose; Terry W. McDaniel, Morgan Hill; Jill D. Berger, San Jose; John H. Jerman, Palo Alto, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/459,262

(22) Filed: Dec. 10, 1999

Related U.S. Application Data (60) Provisional application No. 60/112,262, filed on Dec. 15, 1998.

(51) Int. Cl.[7] .............................................. G11B 11/00
(52) U.S. Cl. ............................. 369/13.38; 369/13.53; 428/64.3
(58) Field of Search ......................... 369/13, 14, 275.2; 365/122; 428/64.3, 65.8, 65.4, 694 ML, 694 SC, 694 PR, 694 TP, 694 TR, 694 BP (56) References Cited

U.S. PATENT DOCUMENTS

| | | | |
|---|---|---|---|
| 6,110,610 A | * | 8/2000 | Fujita et al. |
| 6,160,769 A | * | 12/2000 | Ohnuki et al. ................ 369/13 |
| 6,177,150 B1 | * | 1/2001 | Fujita et al. ................ 427/586 |

FOREIGN PATENT DOCUMENTS

| | | | |
|---|---|---|---|
| JP | 7-44912 | * 2/1995 | ................ 369/13 |
| JP | 11-185313 | * 7/1999 | ................ 369/13 |

\* cited by examiner

*Primary Examiner*—Tan Dinh
(74) *Attorney, Agent, or Firm*—Moser, Patterson & Sheridan LLP (57) ABSTRACT

A data storage system including a source of heat, a substrate, a storage layer, a lubricant layer, a flying head, and a dielectric layer is disclosed. The dielectric layer is disposed between the lubricant layer and the storage layer. The flying head is disposed above the lubricant layer. The dielectric layer has a heat capacity that is sufficient to generate a temperature gradient between the storage layer and the lubricant layer so as to reduce lubricant evaporation onto the flying head.

17 Claims, 6 Drawing Sheets

Fig. 2

| | |
|---|---|
| | Air |
| 186 — | Lube |
| 185 — | Carbon |
| 184 — | SiN |
| 183 — | MO |
| 182 — | SiN |
| 181 — | AlX |
| 180 — | Polycarbonate |

| Layer | Thickness (nm) | n | k | $k$ (W/cm-K) | $\sigma$ (J/cm$^3$K) |
|---|---|---|---|---|---|
| Air | $\infty$ | 1.0 | 0 | $3 \times 10^4$ | 0.00115 |
| Lubricant | 2.5 | 1.3 | 0 | 0.00125 | 3.0 |
| Carbon | 10 | 1.82 | 0.02 | 0.02 | 1.15 |
| SiN | 75 | 2.0 | 0.01 | 0.015 | 2.52 |
| TbFeCo | 25 | 3.3 | 3.8 | 0.07 | 2.85 |
| SiN | 10 | 2.0 | 0.01 | 0.015 | 2.52 |
| AlX$_{0.02}$ | 35, 50 | 1.8 | 6.8 | 0.25, 0.50 | 2.43 |
| Polycarbonate | $1.20 \times 10^6$ | 1.58 | 0 | 0.0015 | 1.0 |

| Thickness of top SiN (nm) | ΔT (max) of MO layer (K) |
|---|---|
| 42 | 80.7 |
| 83 | 68.6 |
| 205 | 55.05 |
| 246 | 53.85 |
| 368 | 53.32 |
| 409 | 53.2 (essentially constant hereafter) |

REDUCTION OF A TEMPERATURE IN A LUBRICANT INTERFACE

RELATED APPLICATIONS

The present invention is related to and claims priority from Provisional Application 60/112,262, filed Dec. 15, 1998 and is incorporated herein by reference.

SCOPE OF THE INVENTION

The present invention relates to the use of a lubricant interface in a data storage drive and relates more specifically to the reduction of a temperature in the lubricant interface.

BACKGROUND

In prior art data storage systems that incorporate flying head technology, a thin lubricating layer is deposited on a surface of a rotating disk such that surface tribology and aerodynamics are adequate to maintain the head in a flying condition over the disk. In the prior art, however, lubricant contamination of the head from the lubricant layer has been observed and can be largely attributed to heating of the lubricant layer. Thermal modeling of the prior art shows that the lubricant layer may reach temperatures of several hundred degrees Celsius when heated, such as during a laser optical reading/writing process. Additionally, kinetic theory shows that evaporated lubricant molecules have enough speed to reach and condense on transducer regions of the head before the head has an opportunity to translate away from the portion of the lubricating layer that is heated by the laser light. In a head embodiment that comprises apertures, there may also be a tendency for the evaporated lubricant to condense in the apertures. In head embodiments that utilize optical and/or electrical components in these apertures, the evaporated lubricant layer may condense on the components to degrade their performance. In the prior art the evaporated lubricant may act to degrade the performance of the head such that acceptable long-term head performance becomes impossible in the data storage system.

What is needed, therefore, is an improvement over the prior art that minimizes or eliminates the limitations of the prior art.

SUMMARY OF THE INVENTION

The present invention comprises a thick dielectric insulating layer combined with a heat conducting layer at an air/disk interface to provide a potentially simple solution to the problem of interference with optical head performance via lubricant heating. A liquid lubricant head/disk interface as part of the optical path may also be used. The insulating material should be optically transparent and possess a high heat capacity. In one embodiment, the insulating layer is used to generate a large temperature gradient between the MO layer and the disk surface to reduce the surface temperature and lubricant evaporation.

The present invention includes a data storage system, comprising a source of heat, a substrate, a storage layer disposed above the substrate, a lubricant layer disposed above the storage layer, the lubricant layer comprising molecules, a flying head disposed above the lubricant layer, and a dielectric layer disposed between the lubricant layer and the storage layer, wherein the dielectric layer comprises a heat capacity that is sufficient to reduce release of the molecules from the lubricant layer when the storage layer is heated by the source of heat such that contamination of the flying head by the molecules is substantially reduced. The flying head may comprise a far field optical head. The flying head may comprise a near field optical head. The dielectric layer may comprise a thickness of at least 200 nm. The dielectric layer may comprise SiN. The present invention may further comprise a liquid lubricant, wherein the liquid lubricant is disposed between the near field optical flying head and the lubricant layer. The liquid lubricant layer may comprise a branch chained hydrocarbon such as C16, a flourinated solvent such as PFPE, or other similar optically transparent materials. The dielectric layer may comprise a thickness of at least 200 nm.

The present invention also includes a data storage disk, comprising: a substrate, a storage layer disposed above the substrate, a lubricant layer disposed above the substrate, the lubricant layer comprising molecules, and a dielectric layer disposed between the lubricant layer and the storage layer, wherein the dielectric layer comprises a heat capacity that is sufficient to substantially reduce release of the molecules from the lubricant layer when the storage layer is heated.

The present invention also includes a data storage system, comprising: storage means for storing data, lubricant means for providing a lubricant interface to the storage means, heating means for applying heat, and heat dissipation means for reducing a temperature increase of the lubricant means caused by the heating means to a level whereby the lubricating means does not interfere with optical operation of the data storage system. The storage means may comprise a flying optical head. The heat dissipation means may comprise a dielectric layer disposed between the storage means and the lubricant means. The dielectric layer may comprise a thickness of at least 200 nm. The storage means may comprise an MO layer. The heat dissipation means may comprise the lubricant means. The lubricant means may comprise a liquid lubricant. The flying optical head may comprise a near field flying optical head. The heat dissipation means may comprise a dielectric layer.

DETAILED DESCRIPTION

Figure 1:
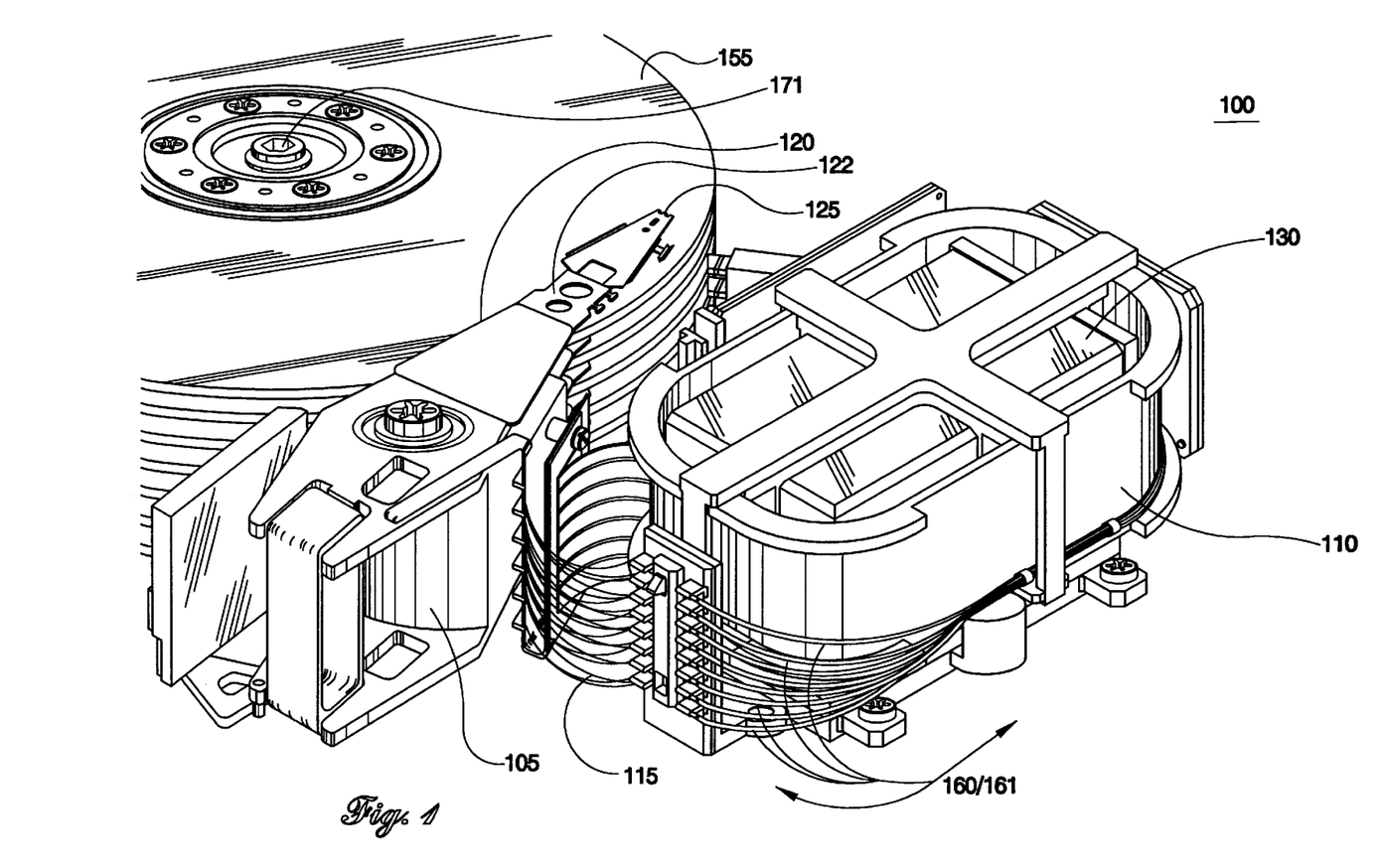
FIG. 1 is a perspective view of a disk drive.

Referring in detail to the drawings wherein similar parts are identified by like reference numbers, there is seen in FIG. 1 a perspective view of a disk drive 100. The disk drive 100 comprises at least one rotating disk 155, which is rotated by a spindle motor assembly 171. The disk drive 100 further comprises at least one individual flying head 125, which is coupled to an individual arm 120 through a respective suspension 122. In the one embodiment, the rotating disk 155 comprises a magneto-optical disk and the flying head 125 comprises a flying magneto optical head. Those skilled in the art will recognize that flying head technology utilizes surfaces that rely on fluid dynamics to maintain the flying head 125 in a flying condition over the disk 155. A new and novel method and apparatus for using optics and magneto-optical technology in combination with flying head technology is described in previously filed patent application Ser. No. 09/226,423, which is assigned to the Applicants of the present application and is incorporated herein by reference. FIG. 1 also illustrates optical fibers 115, which are coupled to an optical switch 130 at one end and to a respective flying head 125 at an opposite end. The optical switch 130 acts to selectively direct light 160/161 between a laser source (not shown) and a particular optical fiber 115.

Figure 2:
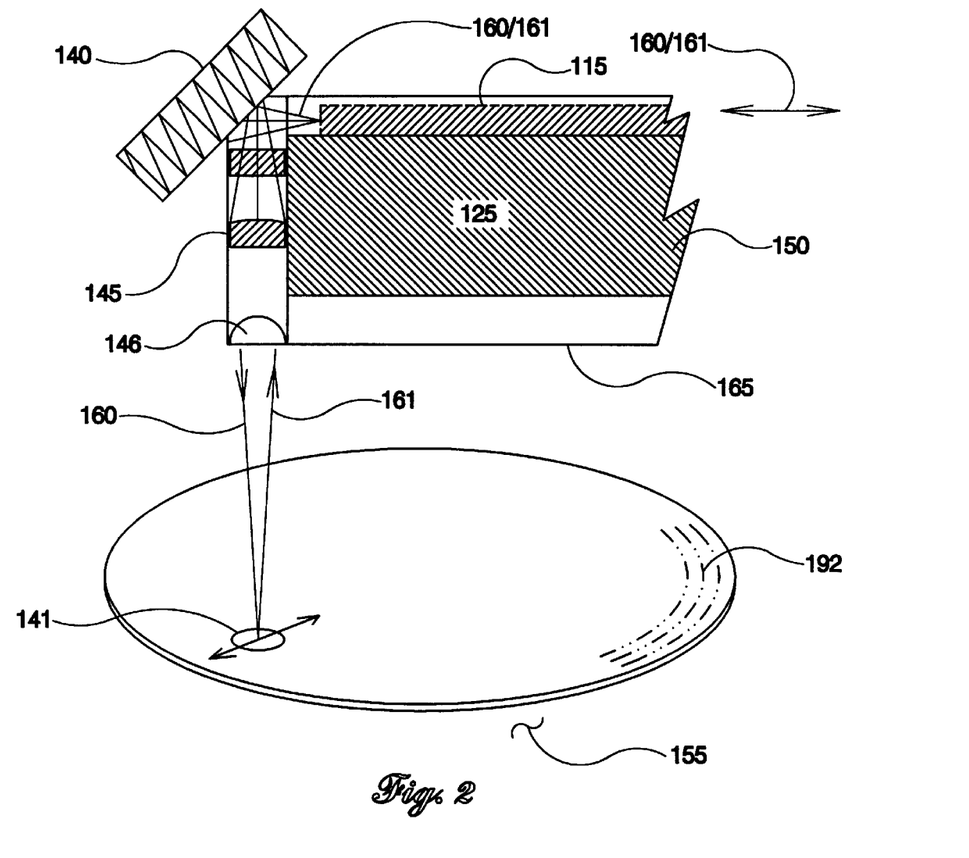
FIG. 2 is a view showing an interaction of various components of the present invention.

Referring now to FIG. 2, there is seen a view showing an interaction of various components of the present invention. In the present invention, the light 160 transmits information to be stored to the disk 155, and the light 161 is reflected from the disk 155 to convey information for subsequent read-out. The optical fiber 115 directs the light 160/161 between the optical switch 130 and a particular flying head 125. The flying head 125 includes optics 115, 140, 145, 146 to direct and focus the light 160 as a spot 141 onto a particular disk 155 and to direct a reflected light 161 from the spot 141. In the preferred embodiment, a coil is also used during the storage and retrieval process discussed above. During reading or writing the disk 155, it is understood that the spot 141 may be used to access the disk and in the process heat the disk. During the heating of the disk 155, contamination of the flying head 125 may occur from molecules that are released from the disk 155.

Figure 3:
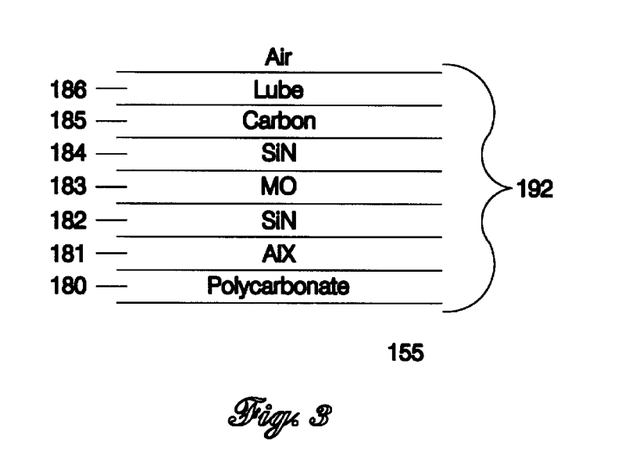
FIG. 3 is one example of a thin film structure that is deposited over a polycarbonate disk substrate.
Figure 4:
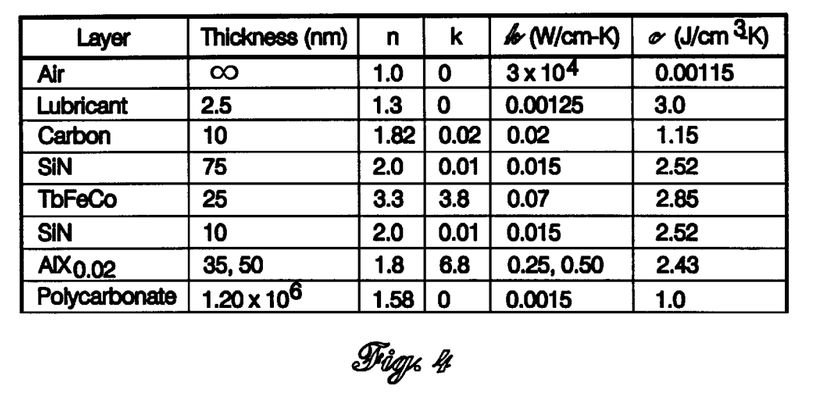
FIG. 4 illustrates properties of thin films of one embodiment of a polycarbonate disk.
Figure 5:
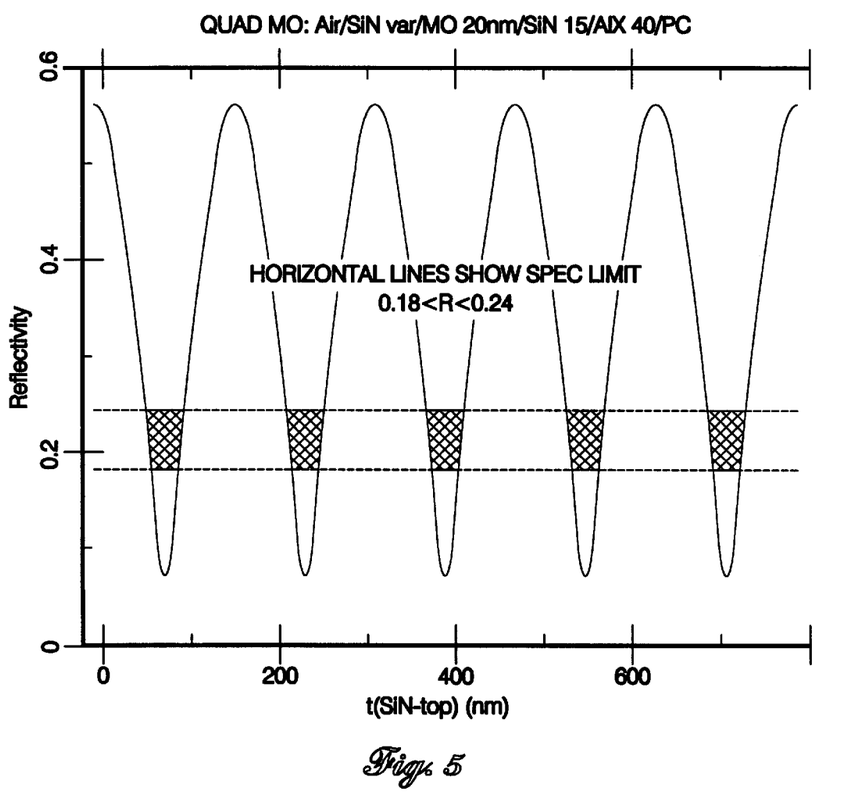
FIG. 5 illustrates a reflectance R of a disk as a function of the thickness of the top dielectric layer.

Referring now to FIG. 3, there is seen one example of a polycarbonate disk substrate 180 and thin film structure 192, the properties of which are summarized in FIG. 4. In one embodiment of the disk 155, the disk comprises a thin film structure 192 deposited over a polycarbonate substrate 180, for example, a 25 nm thick TbFeCo magneto-optical (MO) layer 183, which is deposited over a lower 10 nm SiN dielectric layer 182. In this embodiment, a top 75 nm dielectric layer 184 is deposited over the MO layer 183 followed by a 10 nm layer 185 of amorphous Carbon to improve hardness, durability, and scratch-resistance. In this embodiment, the top dielectric layer 184 comprises SiN. A lubricant layer 186 is deposited as a topmost layer.

Referring now to FIG. 4, there are seen properties of the thin film layers 192 of one embodiment of the disk 155.

Referring to FIG. 5 and FIGS. 1–4 as needed, there is seen a reflectance R of the disk 155 as a function of the thickness of the top dielectric layer. The present invention identifies that it is desired that the light 160/161 be altered as little as possible by the top dielectric layer 184. To this end, the present invention further identifies that the top dielectric layer 184 should be deposited in integer multiples of $\lambda/2n$, where $\lambda$ in an exemplary embodiment is a 660 nm laser wavelength and n is a refractive index of 2.0. Because In the preferred embodiment the reflectance is desired to be in a range of 0.18 and 0.24, it is understood that both the desired reflectance and $\lambda/2n$ parameters limit deposition of the top dielectric layer 184 to a range of values, which are indicated by the cross-hatched areas. As shown on FIG. 5, a 75 nm thick top dielectric layer 184 falls within the leftmost cross-hatched area. The other cross-hatched areas correspond to other dielectric thicknesses, which are discussed below.

Figure 6:
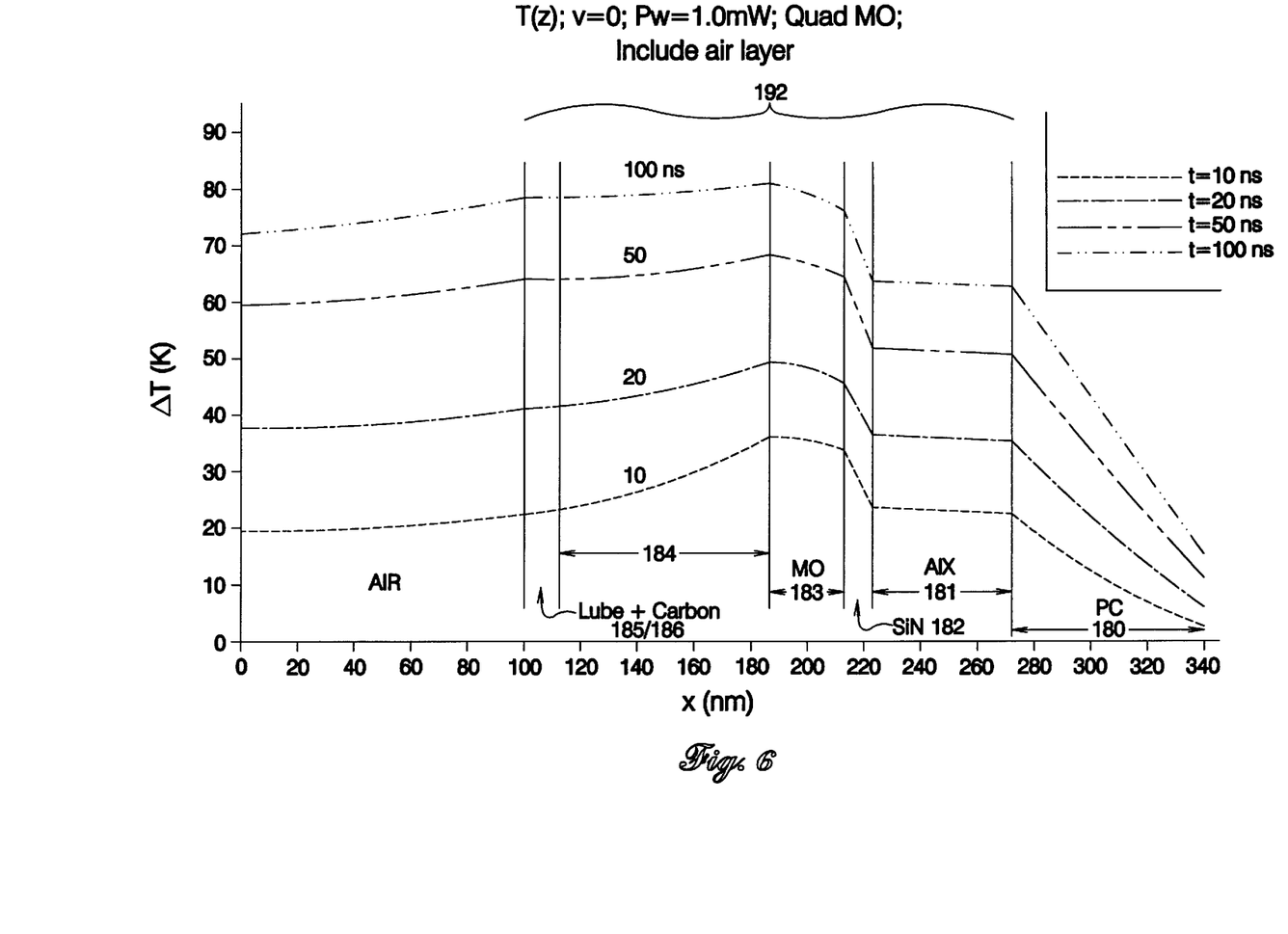
FIG. 6 shows a temperature gradient that forms in a thin film structure.

Referring now to FIG. 6, there is seen a temperature gradient that forms in the thin film structure 192 illustrated in FIG. 4. It is understood that the air above the lubricant layer 186 acts as a good heat insulator and does not carry heat away from the lubricant layer very efficiently. In an exemplary embodiment, a 50 ns pulse of light 160 (FIG. 2) causes a distribution of temperatures to occur between the MO film layer 183 and the surface of the lubricant layer 186, which is plotted in FIG. 6 per mW of the power of the incident light 160 vs. a function of a depth x in the stack of thin films. The temperature of the lubricant layer 186 in the embodiment of FIG. 6 is high enough to cause ejection of molecules from the lubricant layer.

Referring now to FIG. 7 and FIGS. 1–6 as needed, there is seen a comparison of various thicknesses of the top dielectric layer 184 vs. a resulting temperature of the MO layer 183. A resulting temperature of the lubricant layer 186 corresponding to a particular dielectric layer 184 thickness is arrived at by modeling the application of the light 160 to the thin film structure 192 at a middle radius of a 130 mm disk 155 rotating at 4500 rpm.

Figure 7:
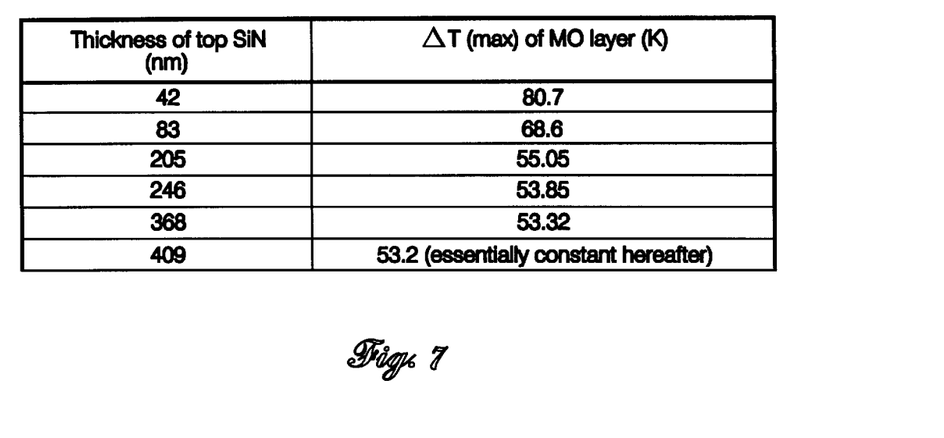
FIG. 7 shows a comparison of various thicknesses of a top dielectric layer vs. a resulting temperature of a MO layer.

In the model, the light 160 was assumed to be a 1 mW 50 ns pulse of laser light. Plane wave modeling was used and it was further assumed that the light 160 was provided by far field optical illumination at normal incidence. In the model, the thin film stack 192 was comprised in the following order: air, top dielectric SiN layer (variable thickness), MO layer 20 nm, lower dielectric SiN layer (15 nm), AIX reflective layer (40 nm), and a polycarbonate substrate. In the model, the top dielectric layer thickness was selected to give the thin film stack 192 the preferred reflectance between 0.18 and 0.24. The mass/volume of the lubricant layer 186 was treated as being negligible so that it could be assumed that the lubricant layer 186 temperature equaled that at the interface between the top dielectric layer and the air above it. Results from the model showed that 60–65% of the light 160 was absorbed by the MO layer and that the heat in the MO layer conducted outward in three dimensions through the thin film structure 192.

The present invention identifies what the model discussed above illustrates, that by thickening the top dielectric layer 184, the top dielectric layer's heat capacity may be increased, that the maximum temperature of the MO layer 183 in the thin film structure 192 may be reduced, and that, consequently, release of molecules from the lubricant layer 186 may be reduced. A further benefit provided by a thickened dielectric layer 184 is that any layers below are less subject to physical damage. FIG. 7 also illustrates, if the top dielectric layer 184 is increased beyond a certain thickness (approximately 105 nm), the rate of temperature reduction decreases.

Figure 8:
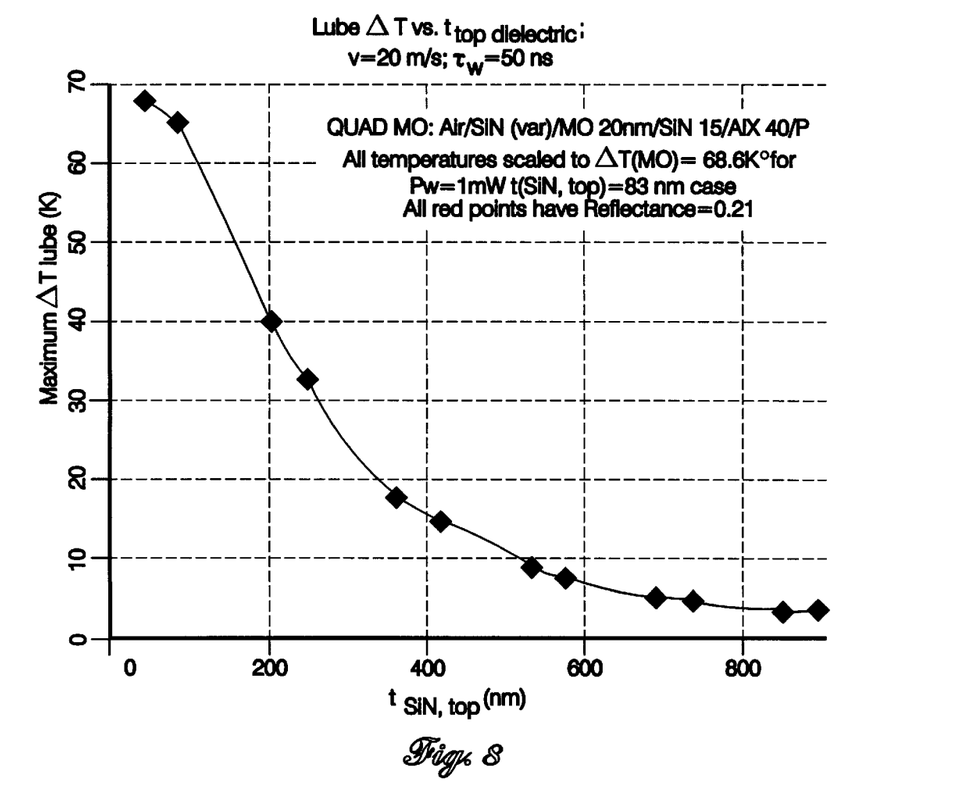
FIG. 8 shows a maximum temperature rise of a lubricant layer after normalization of an MO layer temperature to a 83 nm dielectric layer.

Referring now to FIG. 8 and FIGS. 1–7 as needed, there is seen a maximum temperature rise of the lubricant layer 186 after normalization of the MO layer 183 temperature to a 83 nm dielectric 184 layer. As seen in FIG. 8, thickening the top dielectric layer 184 lowers the lubricant layer 186 peak temperature. For example, by increasing the top dielectric layer 184 from 83 nm to 246 nm, the lubricant layer 186 temperature can be halved. It is understood that by decreasing the lubricant layer 186 temperature in this manner, the power of the light 160 may be increased without reaching the 250 degC boiling point of the lubricant layer 186. Increased light 160 power is beneficial because an increased data signal readout amplitude may be achieved.

The present invention further identifies that the lubricant layer 186 temperature may also be reduced by the layer 185, which may comprise, for example, a diamond-like carbon. The layer 185 provides heat conduction and may be used to spread the heat quickly over a wide area and to diffuse and lower the temperature at any given point of the lubricant layer 186.

It is understood that as the thickness of the top dielectric layer 184 is increased, the time to sputter the layer may be increased, the surface roughness of the disk 155 may be increased, and that for a given required fly height of the flying head 125, the distance between the flying head 125 and the MO layer 183 may become undesirably increased. It is also understood that for a given fly height above the lubricant layer 186, addition of the layer 185 may further increase the distance between the flying head 125 and the MO layer 183. By increasing the distance between the flying head 125 and the MO layer 183, the data readout performance of the head 125 may become degraded as, for instance, the depth of focus of the head 125 may not be sufficient to focus the light 160 onto the MO layer 183.

Referring now to FIG. 9 and FIGS. 1–8 as needed, there is illustrated the use of a liquid lubricant between a flying head and a disk. In a further variation of the present invention, an optically transparent liquid lubricant 177 may be disposed in the optical path between the head 125 and the disk 155 such that an air bearing surface 178 of the head 125, as well as other components comprising the head, such as the optics 146, are in contact with the liquid lubricant 177. In this embodiment, contamination of the optics 146 by the release of molecules from the lubricant layer 186 is prevented because the liquid lubricant 177 can be filtered to direct contaminants away from the head 125. Although the potential for contamination from heating of the lubricant layer 186 is reduced, the heat generated by the light 160 passing through the liquid lubricant 177 and/or at the spot 141 may cause boiling of the liquid lubricant as well as formation of air bubbles in the optical path of the light 160/161. The liquid lubricant 177 may act as a heat sink to diffuse and lower some of the heat generated by the light 160, but it alone may not reduce the heat sufficiently. The present invention identifies that if the liquid lubricant 177 is used in combination with the thickened top dielectric layer 184 and/or the heat conduction layer 185 to carry away heat from the spot 141 and the liquid lubricant in the vicinity of the spot, the temperature of the liquid lubricant 177 may be sufficiently reduced.

As described above, use of the thickened dielectric layer 184 and/or layer 185 may increase the distance between the flying head 125 and the MO layer 183. The present invention identifies that this increased distance may be further reduced when a near field optical embodiment of the flying head 125 is used. It is understood that a near-field flying optical head 125 may be more susceptible to contamination from the lubricant layer 186 than a far-field optical flying head because of its closer proximity to the lubricant layer 186. In the present invention, however, because the optically transparent liquid lubricant 177 may carry contaminants away from the head 125, a near field head 125 may be used despite the fact that the lubricant layer 186 is also used.

It is well known in the art, that for a given optical configuration of the head 125, the higher the fly height of the head 125 above the MO layer 183, the larger the size of the spot 141. A larger spot 141 may act to reduce achievable areal density and signal readout. Areal density in magneto-optical recording can be increased by decreasing the diffraction-limited spot 141. One method that can be used to decrease the size of the spot 141 is to increase the effective numerical aperture of the optics used to focus the spot 141; this can be achieved by focusing the light 160 inside the surface of a high refractive index material. It is well know in the art that the size of the diffraction limited spot 141 is proportional to $\lambda/NA$, where $\lambda$ is the wavelength of the light 160 and $NA = n \sin\theta$ is the numerical aperture defined as the index of refraction n times the sine of the cone half-angle $\theta$ of the focused light 160. When the light 160 is focused inside the surface of a glass of index n, the size of the spot 141 is decreased by $1/n$. These conditions can be achieved by using near field optics on the flying head 125 that may include, for example: the optical fiber 115, and a combination of an objective lens 145 and a solid immersion lens (SIL) 146 (shown in FIG. 2 and FIG. 9). In an exemplary embodiment, the optical fiber 115 is a single mode optical fiber, the SIL lens 146 is a 100 $\mu$m radius hemisphere of LaSF35 glass (n=2.00), positioned so that the light 160 comes to a focus at the plano surface of the hemisphere. In this embodiment, the head 125 should be sealed, so that the liquid lubricant 177 is present only in the optical path between the SIL 145 and the disk 155. Focusing the light 160 at the surface of the high index glass increases the effective system NA to 1.3, resulting in a diffraction-limited spot size of 0.3 $\mu$m full-width-half-maximum.

Figure 9:
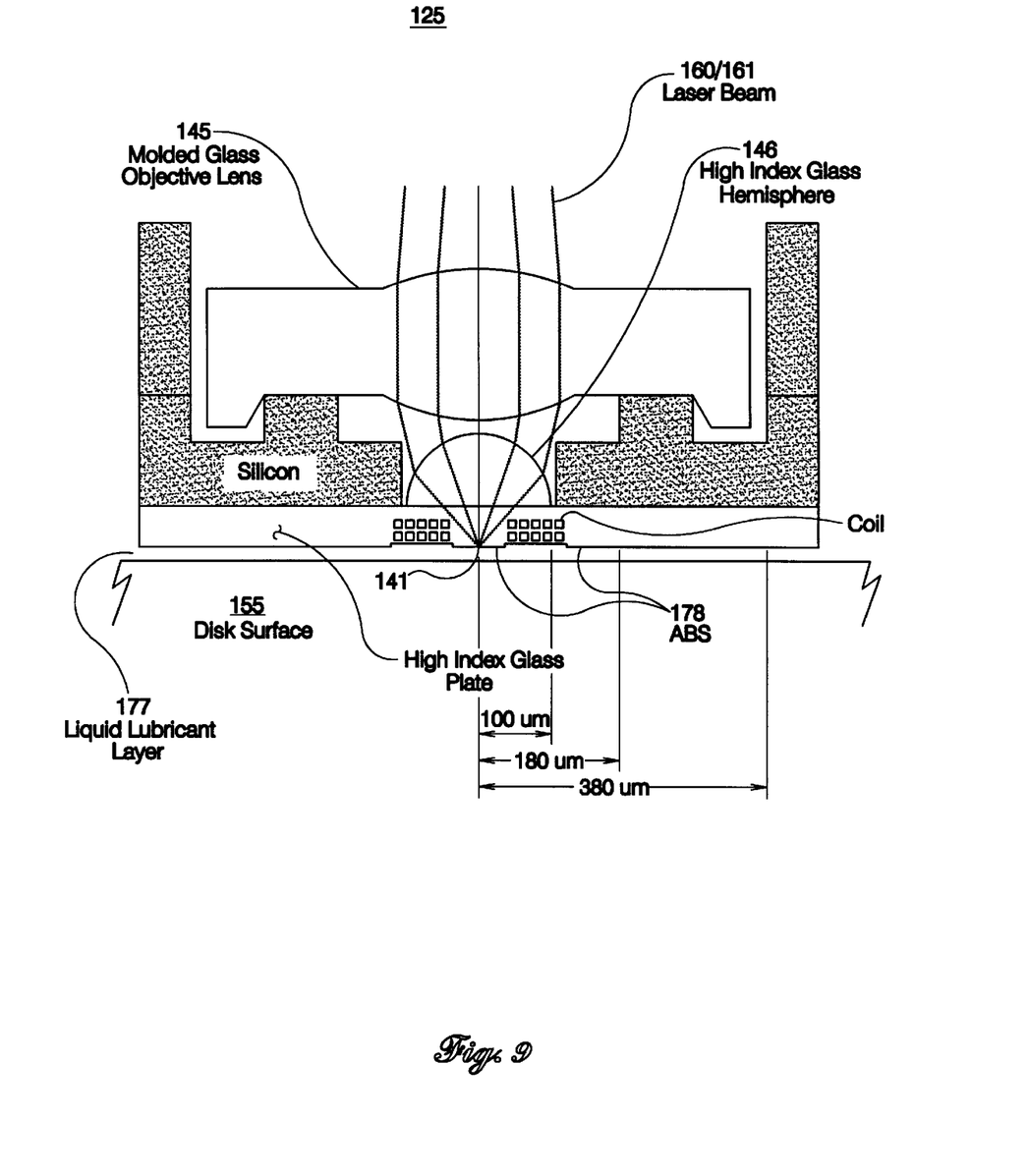
FIG. 9 illustrates the use of a liquid lubricant between a flying head and a disk.

It is understood that difficulties may be encountered if an air gap is present between the SIL lens 146 and the disk 155. Rays of the light 160, which exceed the critical angle for total internal reflection (TIR) at the SIL/air interface, are reflected back into the SIL instead of being transmitted through the SIL/air interface. This critical angle is $\theta_c = \sin^{-1}(1/n)$, where n is the refractive index of the SIL. When the SIL is used in combination with a high NA objective lens 145, as in FIG. 2, a significant portion of the rays are totally internally reflected. Under these conditions, the coupling efficiency of the light 160 to the disk 155 is decreased, and interference patterns between the evanescent, or surface, waves of the light along the SIL/air and disk/air interfaces create a complex behavior which can dramatically alter a readout signal derived from the reflected light 161. Small variations in the air gap thickness can give rise to large signal variations. The present invention identifies that the presence of a high index liquid lubricant 177 between the SIL 146 and the disk 155, as shown in FIG. 9, completely eliminates TIR and all of its resulting complications. In an exemplary embodiment, the liquid lubricant 177 thickness is very thin, there are no significant optical aberrations introduced by the liquid lubricant, even with large index gradients. The refractive index of the liquid lubricant 177 should be large enough to prevent total internal reflection of the light 160 at the SIL/liquid lubricant interface. This condition is $n_{liquid\ lube} > n_{SIL} \times NA_{obj}$, where $NA_{obj}$ is the image NA of the objective lens 145. For a 0.71 NA objective lens 145, and assuming a SIL lens 145 of index 2.00, $n_{liquid\ lube} > 1.42$. As long as the liquid lubricant 177 index satisfies this criterion, small optical thickness variations are virtually unimportant. The liquid lubricant 177 would be designed with a high enough index to stay above the minimum required value under temperature fluctuations.

Although the present invention is described to include reduction of temperature in a lubricant interface in the context of specific elements and disk structures, those skilled in the art will recognize that the present invention should not be limited to only those elements and disk structures described. For example, the disk drive described above may comprise optical, magneto-optical, and magnetic-optical embodiments, which would require other types of known optical, electrical elements, and thin film structures, and yet utilize the invention discussed above. A latitude of modification, various changes and substitutions are also intended in the foregoing disclosure, and it should be further appreciated that in some instances some features of the invention may be employed without a corresponding use of other features and yet not depart from the scope of the invention. These considerations should make it clear that the invention should be limited only by the scope of the claims presented below.

What is claimed is:

1. A data storage system, comprising:
   a source of heat;
   a substrate;
   a storage layer disposed above the substrate;
   a lubricant layer disposed above the storage layer, the lubricant layer comprising molecules;
   a flying head disposed above the lubricant layer; and
   a dielectric layer disposed between the lubricant layer and the storage layer, wherein the dielectric layer has a thickness of at least 200 nm that provides a heat capacity sufficient to reduce release of molecules from the lubricant layer when the storage layer is heated by the source of heat such that contamination of the flying head by the molecules is substantially reduced.

2. The data storage system of claim 1, wherein the flying head comprises a far field optical head.

3. The data storage system of claim 1, wherein the flying head comprises a near field optical head.

4. The data storage system of claim 3, wherein the dielectric layer comprises SiN.

5. The data storage system of claim 3, further comprising a liquid lubricant, wherein the liquid lubricant is disposed between the near field optical flying head and the lubricant layer.

6. The data storage system of claim 5, wherein the liquid lubricant layer comprises a branch chained hydrocarbon.

7. The data storage system of claim 5, wherein the dielectric layer comprises a thickness of at least 200 nm.

8. A data storage disk, comprising:
   a substrate;
   a storage layer disposed above the substrate;
   a lubricant layer disposed above the substrate, the lubricant layer comprising molecules; and
   a dielectric layer disposed between the lubricant layer and the storage layer, wherein the dielectric layer has a thickness of at least 200 nm that provides a heat capacity sufficient to substantially reduce release of the molecules from the lubricant layer when the storage layer is heated.

9. The data storage disk of claim 8, wherein the dielectric layer comprises SiN.

10. A data storage system, comprising:
    storage means for storing data;
    lubricant means for providing a lubricant interface to the storage means;
    heating means for applying heat; and
    heat dissipation means for reducing a temperature increase of the lubricant means caused by the heating means to a level whereby the lubricating means does not interfere with optical operation of the data storage system, wherein the heat dissipation means comprises a dielectric layer disposed between the storage means and the lubricant means, and wherein the dielectric layer comprises a thickness of at least 200 nm.

11. The data storage system of claim 10, wherein the storage means comprises a flying optical head.

12. The data storage means of claim 10, wherein the storage means comprises an MO layer.

13. The data storage system of claim 12, wherein the heat dissipation means comprises the lubricant means.

14. The data storage system of claim 13, wherein the lubricant means comprises a liquid lubricant.

15. The data storage system of claim 14, wherein the flying optical head comprises a near field flying optical head.

16. The data storage system of claim 13, wherein the heat dissipation means further comprises a dielectric layer.

17. A data storage system, comprising:
    a heat source;
    a substrate having a storage layer thereon;
    a lubricant layer disposed above the storage layer; and
    a dielectric layer disposed between the storage layer and the lubricant layer;
    wherein the dielectric layer has a thickness of at least 200 nm that provides a heat capacity sufficient to reduce lubricant layer evaporation by generating a temperature gradient between the storage layer and the lubricant layer when such storage layer is heated by the heat source.

* * * * *